June 11, 1963   N. J. THOMPSON   3,093,385
MARKET BASKET CART WITH CHILD'S SUPPORT
Filed Jan. 15, 1962   2 Sheets-Sheet 1
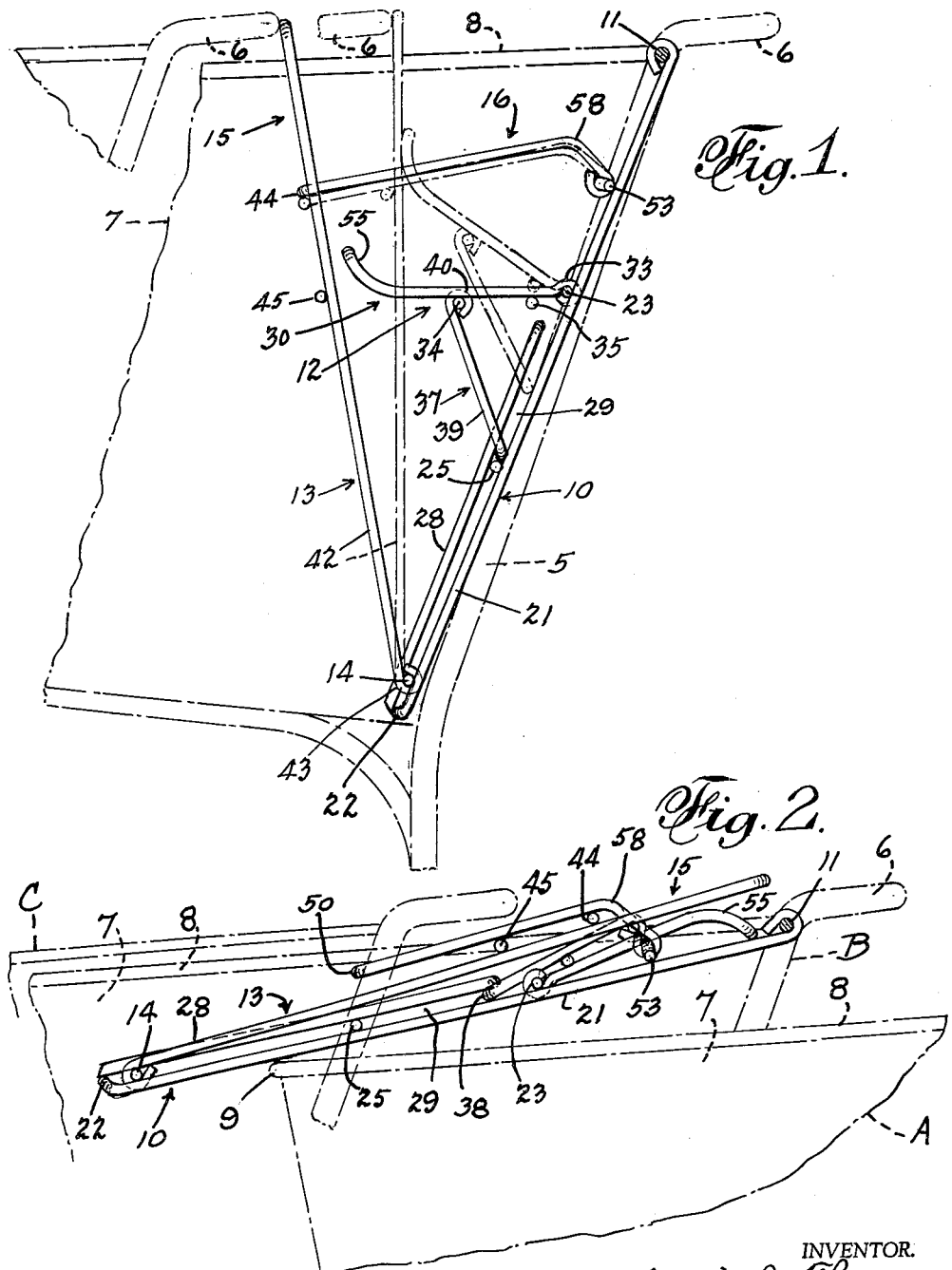
INVENTOR.
Norris J. Thompson
BY C. G. Stratton
ATTORNEY June 11, 1963  N. J. THOMPSON  3,093,385
MARKET BASKET CART WITH CHILD'S SUPPORT
Filed Jan. 15, 1962  2 Sheets-Sheet 2
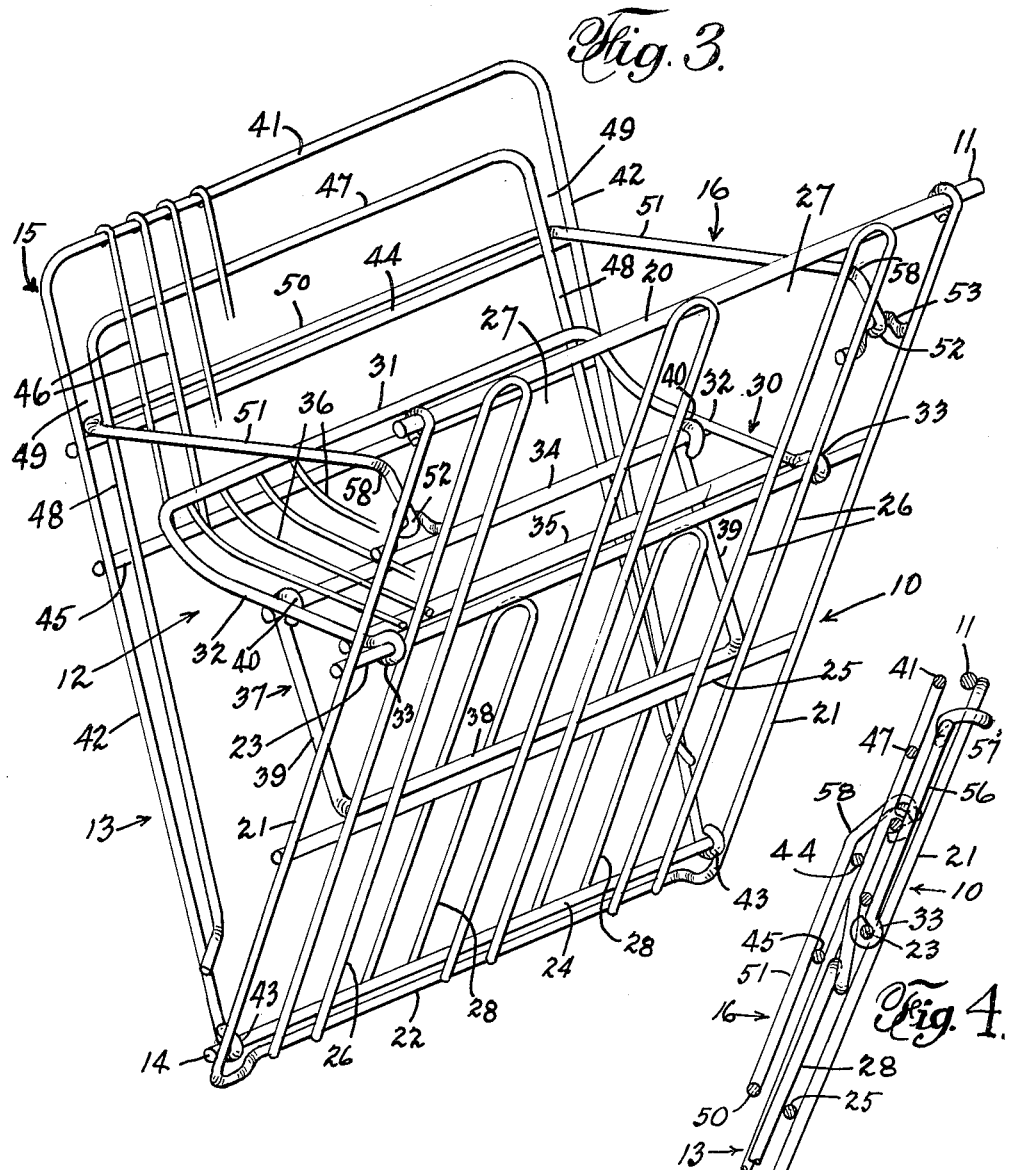

United States Patent Office 3,093,385
Patented June 11, 1963

3,093,385
MARKET BASKET CART WITH CHILD'S SUPPORT
Norris J. Thompson, Arcadia, Calif., assignor to National Carts, Inc., Azusa, Calif., a corporation of California
Filed Jan. 15, 1962, Ser. No. 166,078
11 Claims. (Cl. 280—33.99)

This invention relates to a market basket cart structure that is provided with a child's seat and arm rests, the cart being of the nesting type that conserves storage space. Nesting of such carts is usually afforded by hinging the upper edge of the rear end wall of the basket of said cart so the same swings upwardly to lie generally horizontally when swung to such a position by the front end of the basket of another cart, said latter basket then assuming a position partly nested within the basket of the first cart.

An object of the present invention is to so combine the hinged rear end wall of the basket of a market cart with a child's support that the seat of said support is wholly carried by the mentioned hinged rear wall and is foldable generally flatwise against the rear end wall by engagement of a rear inner wall that is hingedly connected to the rear end wall at the lower ends of said walls. Said folding of the seat takes place when the rear inner wall swings toward the rear end wall.

Another object of the invention is to provide a combined structure as above contemplated in which the upper portion of said rear inner wall constitutes the back of the child's support, said back being in cooperative association with the seat, although unconnected to said seat.

A further object of the invention is to provide a structure as characterized above in which the two hingedly connected walls are operatively connected to maintain the same in child-accommodating positions, said means constituting arm rests on either end of the seat and located within the confines of the basket and below the upper edge of said basket.

This invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description and which is based on the accompanying drawings. However, said drawings merely show, and the following description merely describes, preferred embodiments of the present invention, which are given by way of illustration or example only.

In the drawings, like reference characters designate similar parts in the several views.

FIG. 1 is a broken, side elevational view of the present market cart with a child's seat and arm rests according to the present invention, and showing same in full-line child-supporting position and in broken lines in a partially folded position.

FIG. 2 is a similar view showing the child's seat and arm rests folded and partly swung upwardly by another cart, the full upward position of the structure being somewhat more horizontal than the position that is shown in this figure.

FIG. 3 is a perspective view of the present structure in the full-line position of FIG. 1, as seen from the rear of the market basket.

FIG. 4 is a broken view, partly in cross section, of a folded, modified construction more particularly described hereinafter.

FIGS. 1 and 2 show a conventional market cart in fragmentary form, said cart being shown with a support frame 5 on which a cart-propelling handle 6 is provided, and a container or basket 7 is mounted on the frame 5. It is usual for said basket to have an upper edge 8 that slopes downwardly toward the front of the cart so that the forward end 9 of said edge 8 is substantially below the handle 6. The side and front walls of such a basket are immovable. The rear end wall 10 is mounted on a hinge 11. Said latter wall, when swung down, as in FIG. 1, closes the rear of the basket 7. When said wall 10 is in said basket closing position, it is disposed at a forward and downward angle.

The present structure is wholly carried by said rear end wall 10 and comprises, generally, a child's seat assembly 12 entirely carried by the wall 10. A rear inner wall 13 is connected at its lower edge by a hinge 14 to the lower end of the rear end wall 10. The upper portion 15 of said wall 13 constitutes the back-rest for the child's seat, and stop means 16 interconnects said walls 10 and 13 to maintain the latter wall at a desired forward angle relative to the former wall, so that said wall 13 is entirely clear of the forward edge of the seat 12. Thus the seat may gravitationally assume a horizontal child-supporting position entirely carried by the wall 10.

The wall 10 is shown as formed of heavy wires or rods, the same comprising a top rod 20 having ends that form the mentioned hinge 11 that connects with the cart frame 5 forward of the handle 6. Said rod 20 is connected by side rods 21 to a bottom rod 22 which, as shown, is forwardly bent to lie forward of the plane in which the rods 21 are disposed. The frame formed by rods 20, 21 and 22 is provided with a horizontal intermediate hinge rod 23, a horizontal lower hinge rod 24 which forms the hinge 14, and a horizontal stop or support rod 25 between the rods 23 and 24. A set of filler rods 26 spans between the hinge rods 20 and 24, said filler rods 26 being so spaced as to form openings 27 of such size that the legs of a child on the seat 12 may pass therethrough. Said filler rods 26 are applied to the rearward sides of rods 20, 22, 23 and 25. Shorter filler rods 28 are applied to the forward sides of rods 24 and 25, the same terminating below the rod 23 so as not to intrude on the spaces 27. As can be seen in FIGS. 1 and 2, the upper ends of rods 28 and the adjacent portions of the rods 26, although transversely offset, as shown in FIG. 3, define a transverse space 29.

As best shown in FIG. 3, the seat assembly 12 comprises a generally rectangular seat 30 that is formed of a transverse rod 31 that connects two side rods 32 in generally U-form. The ends 33 of rods 32 are formed as eyes hingedly connected to the hinge rod 23. The U-shaped seat frame thus provided is provided with a spanner hinge rod 34 midway between the ends of side rods 32 respectively, and a spanner rod 35 adjacent to the hinge eyes 33. The rectangular seat frame thus provided is shown with small filler rods or wires 36 that are parallel to the rods 32 and extend between the rods 31 and 35. The main portion of this seat frame has a horizontal disposition, as shown. The forward edge thereof—the rod 31 and the adjacent portions 32—are upwardly bent or curved, as best shown at 55 in FIG. 1, so that the rod 31 is disposed above the horizontal plane of the remainder of the seat frame.

The seat assembly 12 further includes a support prop 37 which, in this case, comprises a transverse rod 38 that is disposed in the mentioned space 29 and is normally supported on the stop rod 25, as shown in FIGS. 1 and 3. Side rods 39 of the support prop extend from the ends of rod 38 to eyes 40 that extend around the ends of rods 34 and thereby have hinged connections with the hinge rod 34 of the seat frame 30. As can be seen, when rod 38 is in support engagement with the stop rod 25, the seat 30 is held in a horizontal position so that a child may be seated thereon with his or her legs extending through the openings 27 of the rear end wall 10. As shown in FIG. 2, when the seat 30 is folded against the wall 10, the rod 38 of the support prop 37 slides along the space 29 but is still retained in said space when the curved edge of the seat impinges on the filler rods 26. Due to the slope of wall 10, the seat will retain its folded position until the next rearwardly nested cart is withdrawn, permitting such wall 10 to drop gravitationally until the prop 37 encounters the stop rod 25. Thus, the seat structure, in both positions thereof, is entirely carried by the rear end wall 10.

The rear inner wall 13 comprises an upper transverse rod 41, side rods 42 extending from the ends of rod 41. Eyes 43 on the lower ends of rods 42 are connected to the hinge 14 at the lower end of wall 10. Spanner rods 44 and 45 across the upper part 15 of said inner wall 13, and a set of filler rods 46 extending between the transverse rod 41 and the spanner rod 45, constitute support members for the back of a child who is seated on the seat 12.

In the present instance, the rear inner wall 13 is provided with a transverse rod 47 parallel to and between the rods 41 and 44, and with side rods 48 that extend from the ends of rod 47 along and spaced inwardly from the side rods 42 and are tack welded to the rods 44 and 45. The lower ends of rods 48 are bent outwardly and are tacked, as by welding, to the rods 42 adjacent to the eyes 43 on the lower ends of the latter rods. The inner frame thus provided for the wall 13 imparts rigidity to said wall although the same is fully open below the spanner rod 45. It will be particularly noted that the wall 13 is provided with spaces 49 at the sides thereof above the rod 44 and between the respective pairs of side rods 42 and 48 above described.

The stop means 16 is shown as a bail-like element comprising a cross rod 50 at the front of the inner wall 13, and generally horizontal side rods 51 extending from the ends of cross rod 50, through the above mentioned spaces 49 and terminating in knuckles 52. The rear end wall 10, above where the seat 12 is connected, is provided with pivot loops 53 to which said knuckles 52 connect. It will be noted that the width of the seat 30 is less than the distance between the side rods 51 so that said seat may fold against the wall 10 whether or not the wall 13 is swung rearwardly toward the wall 10.

FIG. 4 shows a modified construction in which the side members 56 of the seat are straight, and spaced tongues 57 extend through the leg openings 27 in the end wall 10, to permit closer folding than is possible with the seat 12 which has its entire seat-edge curved, as shown at 55 in FIG. 2.

FIGS. 1 and 2 make it clear that a child on the seat frame 30 is wholly supported by the wall 10, has the upper portion 15 of the wall 13 as a seat back, and the side rods 51 of the means 16 as arm rests.

When it is desired to nest a cart with other similar carts, the forward end of the cart is pushed against the rear wall of the next forward cart. For example, the forward end 9 of cart A in FIG. 2 is pushed against rear wall 10 of cart B, which is already nested with cart C.

The collapsing of the present child's seat and arm rests is effected not only by said pushing of the forward end of one cart against the rear wall of the next cart, but also by the handle 6 of the next forward cart engaging the transverse rod 41, as shown at the top of FIG. 1. Full pushing together of two adjacent carts will cause the curved end 55 of the seat to slide upward on the inner wall 13 thereby causing the seat to fold as shown in FIG. 2. The dotted line position in FIG. 1 is one between the full line position in FIG. 1, in which the seat and arm rests are ready to hold a child, and the completely folded position thereof in FIG. 2. The handle 6 of the next forward cart engaging the inner wall 13 in the manner shown in FIG. 1, assists in the initial folding movement of the seat. Final folding movement is effected by continuing the pushing of the forward end of one cart against the rear wall of the next forward cart, as stated.

The stop means 16 is so arranged that twisting of the knuckles 52 laterally on the loops 53 is prevented. Furthermore, the cross rod 50 holds the inner wall 13 in its different positions, and guides same in its movement from one position to another. The bends 58 in the side rods 51 provide a hooking action around the cross bar 44 when the inner and rear walls are folded together, as shown in FIG. 4, whereby to tend to hold said walls together. The remainder of the side rods 51 and the cross rod 50 extend parallel with the inner wall 13 in the folded position.

When the carts are pulled apart, the two pivoted walls 10 and 13 fall by gravity from the position shown in FIG. 2 to the full line position in FIG. 1. The momentum of the fall and the sudden stop at the bottom normally cause the wall 13 to spring away from the wall 10 and the child's seat and arm rests to assume their horizontal positions. However, it is to be understood that when desired the inner wall 13, the seat and the arm rests may be folded together even though the rear wall 10 is in its lowered position (generally at the angle shown in FIG. 4). In this latter position, the depending weight of the stop means 16, together with hook 58 around the inner wall 13, tends to lock the two walls 10 and 13, and the interposed seat, in their folded position.

The flatness of the side members 56 of the seat in FIG. 4 permits even tighter folding, as shown in that figure, than with the form shown in FIGS. 1, 2 and 3.

The upturn of the tongues 57 and at the side 31 of the seat 12 assist in preventing child's toys (and other small articles) from falling into the main portion of the basket. It is to be understood that the child's seat portion is useful for holding articles even though a child is not in the cart.

While the foregoing has illustrated and described what is now contemplated to be the best mode of carrying out the invention, the constructions are, of course, subject to modification without departing from the spirit and scope of the invention. Therefore, it is not desired to restrict the invention to the particular forms of construction illustrated and described, but to cover all modifications that may fall within the scope of the appended claims.

Having thus described this invention, what is claimed and desired to be secured by Letters Patent is:

1. In a market basket cart having a frame supporting a basket that is provided with an end wall pivoted at its upper edge and swingable upwardly within the basket for nesting another, similarly mounted basket therein, the combination of an inner wall pivoted to the lower edge of said end wall, a child's seat pivotally supported between said walls but exclusively supported on one of said walls, said end wall having opening means for the legs of a child sitting on said seat, stop means on the seat-supporting wall preventing downward pivotal movement of the seat when it has substantially reached a horizontal position, and means limiting pivotal movement of said walls away from each other when they are a greater distance apart than the width of the seat between the walls.

2. The combination stated in claim 1, in which the inner wall is disposed in the path of the handle of a therewith nesting, similar cart to move the walls toward each other during nesting of the baskets, and the walls being arranged to fold the seat therebetween by movement of the walls toward each other.

3. The combination stated in claim 1, in which the child's seat is pivotally supported between said walls but exclusively supported on the said end wall which is pivoted at its upper edge, and in which the child's seat extends toward the inner wall but is spaced therefrom when the child's seat is in a horizontal position and the inner wall is at its greatest distance from the end wall that is permitted by said limiting means.

4. The combination stated in claim 1, in which the means that limits pivotal movement of said walls away from each other are bars that are arranged at opposite sides of the seat and are spaced a short distance above the seat to provide arm rests for a child sitting on the seat.

5. The combination stated in claim 4, in which said limiting means comprises a continuous, U-shaped strand that is pivoted at the ends of the U to one of the walls, provides said arm rests, and extends across the back of the other wall to support same and to prevent twisting of said pivotal connections to the wall first-mentioned in this claim.

6. The combination stated in claim 5, in which the arm rests have sliding connections with the said supported wall, and the U-shaped member folds by gravity to a hanging position on the outside of the supported wall when the walls are moved together, tending to hold the walls together by the hanging weight of the U-shaped member.

7. The combination according to claim 5, in which the arm rests have upwardly bent hook members and the arm rests are pivotally connected with the end wall and have sliding connections with the inner wall, to permit the U-shaped member to hang on the side of the inner wall away from the end wall when the walls are folded substantially together with the child's seat collapsed therebetween, the hook members engaging part of the inner wall when the elements are in said folded positions, tending to hold the walls together as stated.

8. The combination according to claim 1, in which the end wall, when the cart is in use, is at an acute angle to the horizontal, the inner wall being movable by the handle of a therewith nesting cart from a position away from the child's seat to a position engaging same, and being further movable toward the end wall by sliding the seat upward on the inner wall as the seat is being folded, and the limiting means comprising a continuous rod that is pivoted on the end wall, has a sliding connection with the inner wall and is arranged to fall down by gravity on the side of the inner wall away from the end wall, to tend to maintain the inner wall substantially at said acute angle generally against the end wall, with the child's seat folded between said walls, when the seat is not in use.

9. In a market basket cart having a frame supporting a basket provided with an end wall that is pivoted at its upper edge and swingable upwardly within the basket for nesting another, similarly mounted basket therein, the combination of an inner wall pivoted to the lower edge of said end wall, a child's seat pivotally and exclusively supported on one of said walls, the walls and the seat when collapsed therebetween being generally in a horizontal position when the cart is nested with another, similar cart, the basket having means to stop downward swinging movement of the walls when the nesting carts are moved apart and the assembly of said walls and seat drops by gravity, means to stop downward movement of the child's seat substantially in a horizontal position, said end wall having opening means for the legs of a child sitting on said seat, and means to limit pivotal movement of the inner wall away from the end wall at a point beyond any engagement of the seat by the wall other than the wall supporting the seat, when the seat is in a horizontal position.

10. In the combination stated in claim 9, the seat having its edge curved upward on the side next to the space between the seat and the inner wall, to limit small objects slipping off of said edge of the seat.

11. In a market basket cart having a frame supporting a basket provided with an end wall that is pivoted at its upper edge and swingable upwardly within the basket for nesting another, similarly mounted basket therein, the combination of an inner wall pivoted to the lower edge of said end wall, a child's seat pivotally and exclusively supported on one of said walls, the walls and the seat when collapsed therebetween being generally in a horizontal position when the cart is nested with another similar cart, the basket having means to stop downward swinging movement of the walls when the nesting carts are moved apart and the assembly of said walls and seat drops by gravity, means to stop downward movement of the child's seat substantially in a horizontal position, said end wall having opening means for the legs of a child sitting on said seat, means to limit pivotal movement of the inner wall away from the end wall at a point beyond any engagement of the seat by the wall other than the wall supporting the seat, when the seat is in a horizontal position, and curved means on the side of the seat next to the space between the seat and the inner wall, said curved means fitting in said opening means when the walls are folded together and the seat is collapsed therebetween.

References Cited in the file of this patent
UNITED STATES PATENTS

| | | |
|---|---|---|
| 2,860,885 | Schweitzer | Nov. 18, 1958 |
| 2,891,801 | Sides | June 23, 1959 |
| 2,911,227 | Davis | Nov. 3, 1959 |
| 2,919,927 | Thompson | Jan. 5, 1960 |
| 2,931,662 | Young | Apr. 5, 1960 |
| 2,970,845 | Thompson | Feb. 7, 1961 |